United States Patent [19]
Kidd

[11] Patent Number: 6,076,976
[45] Date of Patent: Jun. 20, 2000

[54] FIBER OPTIC CABLE CONNECTOR

[75] Inventor: Richard Louis Kidd, Stow, Ohio

[73] Assignee: General Motors Corporation, Detroit, Mich.

[21] Appl. No.: 09/049,617

[22] Filed: Mar. 27, 1998

[51] Int. Cl.[7] .................................................... G02B 6/36
[52] U.S. Cl. .............................. 385/84; 385/87; 385/92; 385/94
[58] Field of Search ................................... 385/60, 62, 66, 385/69, 81, 86, 87, 92, 93, 94, 84

[56] References Cited

U.S. PATENT DOCUMENTS

| | | |
|---|---|---|
| 4,787,701 | 11/1988 | Stenger et al. . |
| 4,832,616 | 5/1989 | Stein, Sr. et al. . |
| 4,969,924 | 11/1990 | Suverison et al. . |
| 5,239,604 | 8/1993 | Ziebol et al. . |
| 5,381,500 | 1/1995 | Edwards et al. ........................... 385/78 |
| 5,608,829 | 3/1997 | Oda et al. ................................. 385/76 |
| 5,633,969 | 5/1997 | Jennings et al. . |

FOREIGN PATENT DOCUMENTS

| | | |
|---|---|---|
| 2 020 056 | 11/1979 | United Kingdom . |
| 2 058 392 | 4/1981 | United Kingdom . |
| 2 086 602 | 5/1982 | United Kingdom . |
| 2 201 009 | 8/1988 | United Kingdom . |

*Primary Examiner*—Hung N. Ngo
*Attorney, Agent, or Firm*—Patrick M. Griffin

[57] ABSTRACT

A connection system includes a connector plug for fiber optic cables. The connector plug has a subassembly comprising a ferrule and a seal sleeve that are attached to a fiber optic cable by one or two crimp rings. One crimp ring fits around an extension of the seal sleeve that fits over a collar of the ferrule. A second connector for fiber optic cables has a subassembly comprising a ferrule and a coil spring that are attached to a fiber optic cable by an attachment member that engages the coil spring at one end and is crimped to the fiber optic cable at the other end.

11 Claims, 2 Drawing Sheets

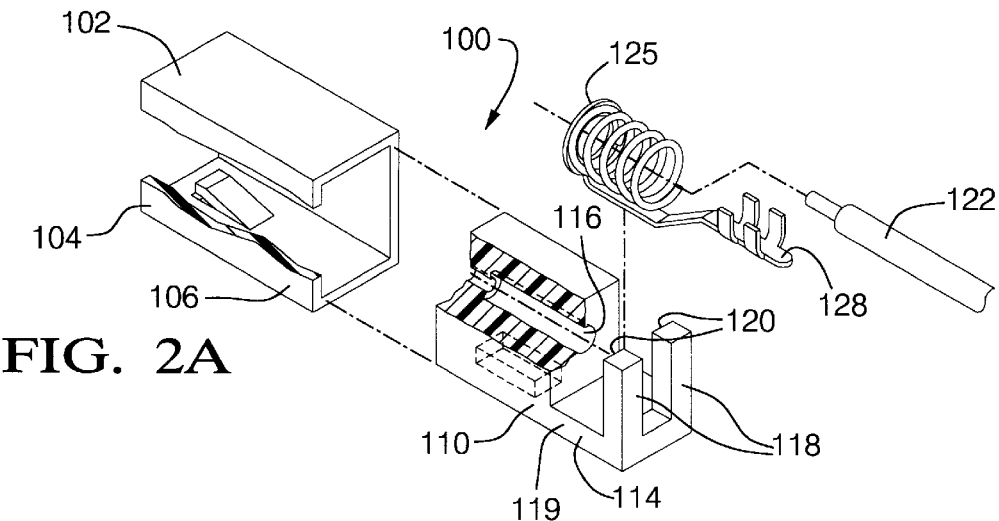
FIG. 2A
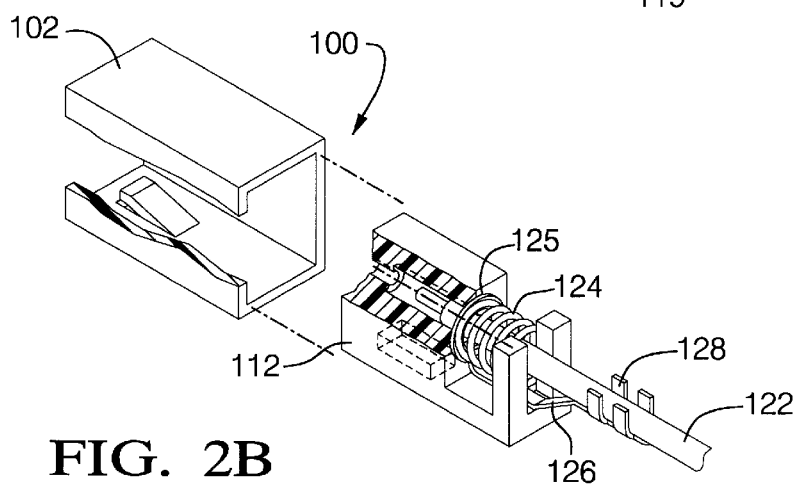
FIG. 2B
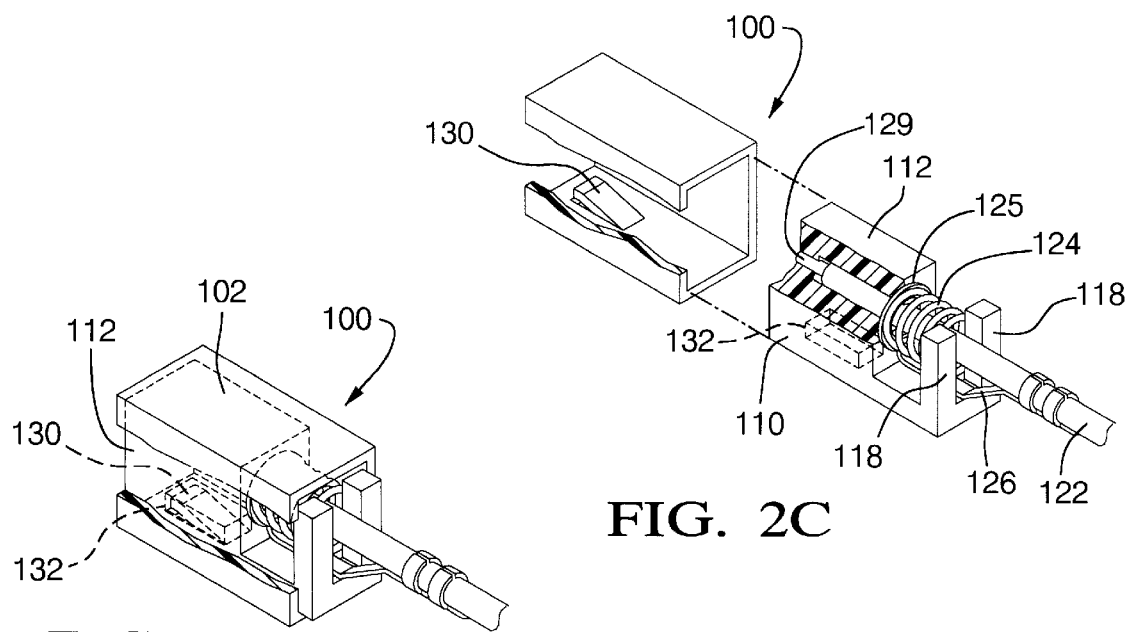
FIG. 2C
FIG. 2D

FIBER OPTIC CABLE CONNECTOR

TECHNICAL FIELD

This invention relates generally to fiber optic cable connectors and, more particularly, to fiber optic cable connectors that have spring biased ferrules attached to fiber optic cable ends.

BACKGROUND OF THE INVENTION

U.S. Pat. No. 4,969,924 granted to Lyle B Suverison et al., Nov. 13, 1990, discloses an electro-optical connector plug that includes a fiber optic cable that is terminated by a thermoplastic ferrule that has a tip that receives the core of the fiber optic cable. The ferrule includes a rearward flange and two radial holes between the tip and the flange. The ferrule is secured onto the end of the optic cable by a metal crimp ring that is disposed in front of the flange over the radial holes and crimped tightly around the ferrule.

The fiber optic cable also carries a coil spring behind the ferrule. The ferrule and spring are simultaneously assembled into a longitudinal cavity of a connector housing by passing the fiber optic cables laterally through an assembly slot and then pulling the cable back so that the ferrule and spring are pulled to seat in the longitudinal cavity. A cover member is then attached. The spring engages the ferrule flange and an internal wall of the cavity and biases the ferrule forwardly so that the tip of the ferrule projects forwardly of the front wall of the cover member.

This electro-optical connector plug has been used successfully by the assignee of this invention. However, the spring is a separate piece that is difficult to handle and assemble. Moreover, the connector plug does not have any provision for sealing the cable end of the connector housing. Furthermore, the spring does not assure protrusion of the fiber optic cable core because the fiber optic cable is fixed with respect to the ferrule by the crimp ring and the spring reacts against the ferrule and the connector housing.

U.S. Pat. No. 5,633,969 granted to Kurt L. Jennings et al. May 27, 1997, discloses an automotive fiber optic cable splice. This splice includes an optic cable that is terminated by a thermoplastic ferrule that has a tip that receives the core of the fiber optic cable. The ferrule includes a medial flange and two radial holes behind the flange. The ferrule is secured onto the end of the cable by a metal crimp ring that is disposed behind the flange over the radial holes and crimped tightly onto the ferrule. The fiber optic cable also carries an elastomeric seal behind the ferrule. The ferrule and seal are assembled into a longitudinal casing and retained by an end cap which compresses the seal between the end cap and the ferrule so that the fiber optic cable is pushed forwardly.

This fiber optic splice connector has also been used successfully by the assignee of this invention. The splice connector does have provision for sealing the cable end of the casing. However, the seal which acts as a spring is also a loose piece that is difficult to handle and assemble into the casing. Moreover, the seal still does not assure the protrusion of the fiber optic cable core because the fiber optic cable is still fixed with respect to the ferrule.

SUMMARY OF THE INVENTION

The object of this invention is to provide a connector for fiber optic cables that improves upon the fiber optic cable connectors described above either by improving the sealing provision at the cable end of the connector or by improving the biasing to assure the protrusion of the fiber optic cable core.

With regard to improved sealing, a feature of the invention in one aspect is that the connector for fiber optic cables has a cable seal that is in a fixed position on the fiber optic cable so as to facilitate handling and assembly into a connector body.

Another feature of the invention with regard to the improved sealing aspect is that the connector for fiber optic cables has a cable seal that is affixed to the fiber optic cable by a dual purpose crimp ring that also fixes the ferrule to the end of the fiber optic cable.

Still another feature of the invention with regard to the improved sealing aspect is that the connector for fiber optic cables has a cable seal that is affixed to the fiber optic cable by a second crimp ring to insure that the cable seal is adequately attached to the fiber optic cable during the lifetime of the cable seal.

Yet another feature of the invention with regard to the improved sealing aspect is that the connector for fiber optic cables has a cable seal that is affixed to the cable by two spaced crimp rings that maintain attachment of the cable seal to the fiber optic cable.

With regard to the improved spring biasing of the fiber optic cable core, a feature of the invention in another aspect is that the connector for fiber optic cables has a biasing spring that acts on the fiber optic cable itself or structure attached to it so that the protrusion of the core tip is assured.

Another feature of the invention with regard to improved biasing of the fiber optic cable core is that the connector for fiber optic cables has a biasing spring that reacts against the fiber optic cable and the ferrule to assure that the core tip protrudes forwardly of the ferrule for biasing engagement with a mating core tip.

These and other objects, features and advantages of the invention will become apparent from the description below, which is given by way of example with reference to the accompanying drawings.

BRIEF DESCRIPTION OF THE DRAWINGS

FIGS. 2A, 2B, 2C and 2D are perspective views of a connector for a fiber optic cable in accordance with a second aspect of the invention.

DESCRIPTION OF THE PREFERRED EMBODIMENT

Figure 1:
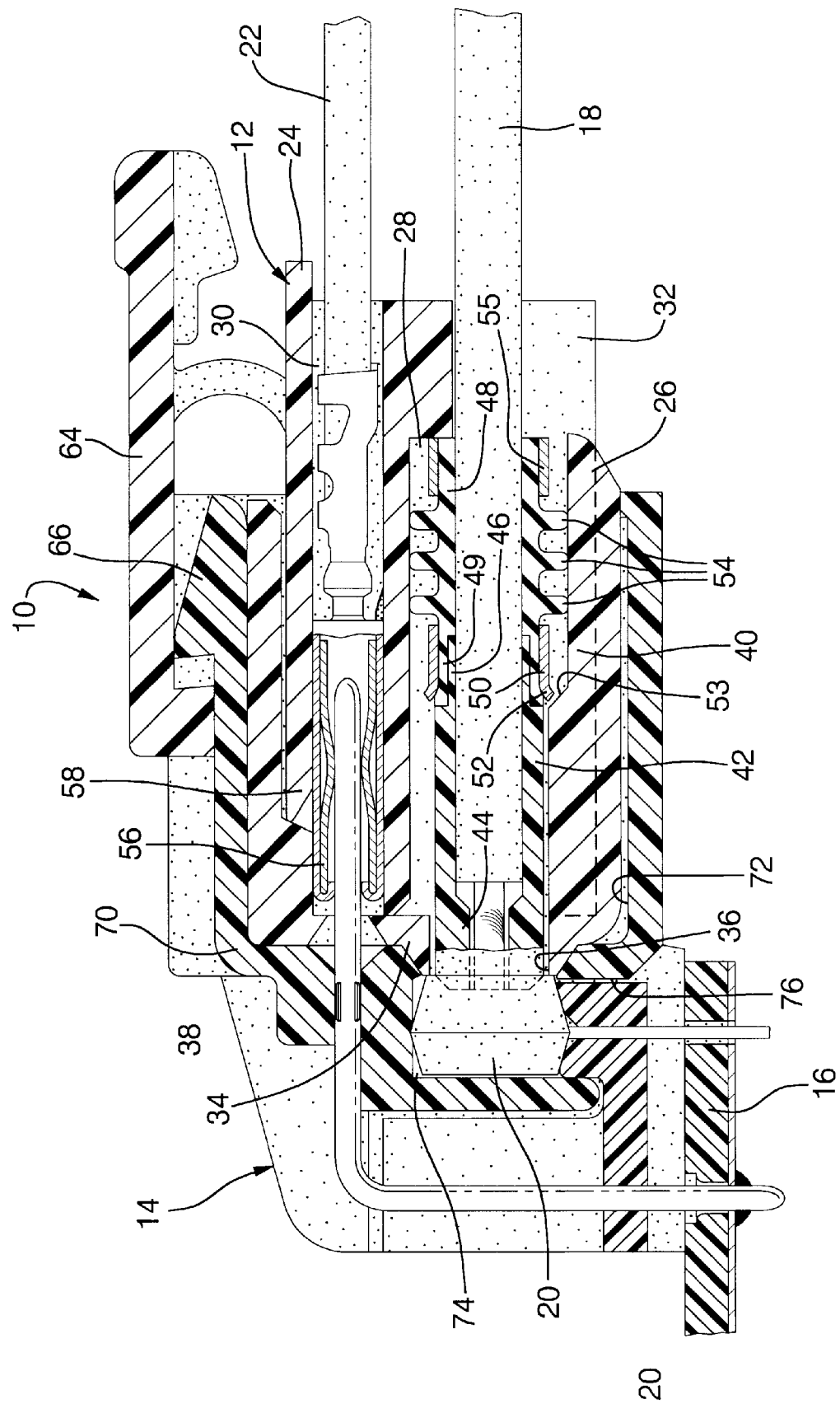
FIG. 1 is a longitudinal section of a connection system that includes a connector for a fiber optic cable in accordance with a first aspect of the invention.

Referring now to FIG. 1 of the drawings, the connection system 10 comprises a connector plug which is indicated generally at 12 and which mates with a header connector which is indicated generally at 14 and which is mounted on a printed circuit board 16. The particular connection system 10 which is disclosed in FIG. 1 makes electro-optical or data link connections and electrical connections. More specifically, the connection system makes electro-optical connections between fiber optic cables 18 of connector plug 12 and electro-optical devices 20 of header connector 14 and electrical connections between electric cables 22 which are terminated in connector plug 12 and terminal pins 23 of header connector 14.

The connector plug 12 for fiber optic cables 18 comprises a two piece connector body having a housing member 24 and a cover member 26. The housing member 24 has two vertically spaced rows of longitudinal cavities. The lower row has two large cavities 28 (one shown) for two fiber optic cables 18, respectively, while the upper row has five smaller terminal cavities 30 (one shown) for five electric cables 22, respectively. Each of the large cavities 28 communicates with a longitudinal assembly slot 32 which one of the fiber optic cables 18 passes through laterally during assembly of the connector plug 12.

The cover member 26 has a forward wall 34 which has two guide holes 36 which communicate with the respective large cavities 28 and five apertures 38 which communicate with the respective smaller terminal cavities 30. The forward wall 34 has conical bosses around the guide holes 36 which protrude outwardly to interfit with the header connector 14 while the apertures 38 are tapered inwardly to guide terminal pins 23 into the smaller terminal cavities 30 as shown in FIG. 1.

The cover member 26 also has two internal ribs 40 which are disposed in the longitudinal assembly slots 32 when the cover member 26 is attached to the housing member 24.

Each fiber optic cable 18 is terminated by a thermoplastic ferrule 42 which has a tip 44 which receives the core of the fiber optic cable 18 and a thin pliable collar 46 at the opposite end that surrounds the cable jacket. Collar 46 has a reduced outer diameter to accommodate attachment of an elastomeric seal sleeve as explained below.

Each fiber optic cable 18 also carries an elastomeric cable seal sleeve 48 that fits snugly around the jacket of the fiber optic cable 18. Cable seal sleeve 48 has a thin extension 49 at one end that fits over collar 46 of ferrule 42. Seal sleeve 48 and ferrule 42 are secured onto the end of fiber optic cable 18 by a dual purpose metal crimp ring 50 that is disposed around the thin extension 49 and ferrule collar 46 nested inside it and crimped tightly around the three concentric components. The forward edge of crimp ring 50 is flared outwardly to provide a third purpose in the form of a stop 52 which cooperates with a stop 53 of the cover member rib 40.

Each elastomeric cable seal sleeve 48 has a plurality of flexible radial sealing lips 54 for sealing the cable end of the plug connector 12. Each elastomeric cable seal sleeve 48 is also secured to the end of the fiber optic cable 18 by a second metal crimp ring 55 that is disposed around an annular rearward end of sleeve 48 and crimped tightly around the rearward end. The cable seal sleeve 48 is thus securely fastened to the fiber optic cable 18 along with the ferrule 42 to provide a stable subassembly that is handled easily throughout the connector assembly process.

The sub-assemblies with ferrules 42 and seal sleeves 48 attached to fiber optic cables 18 are assembled into the respective longitudinal cavities 28 of the housing member 24 by passing the fiber optic cables 18 laterally through the assembly slots 32 and then pulling the cables 18 back so that the ferrules 42 and seal sleeves 48 are pulled to seat in the longitudinal cavities 28 through the forward open ends of the longitudinal cavities.

Socket terminals 56 are attached to the ends of electrical cables 22 by conventional crimping techniques as best shown in FIG. 1. The electric socket terminals 56 are inserted into the terminal cavities 30 through the rearward open ends and retained in the terminal cavities 30 by flexible lock arms 58 of housing member 24.

Cover member 26 is then attached by sliding housing member 24 into cover member 26 until it is retained in any suitable manner, such as by lock nibs on the sides of housing member 24 which snap into side slots of the cover member 26 (not shown). The tips 44 of the ferrules 42 pass through the guide holes 36 of the attached cover member 26. Ferrules 42 are slideably disposed in the two-piece connector body and the seal sleeves 48 bias ferrules 42 in the forward direction (to the left as viewed in FIG. 1) so that the tips 44 project forwardly of the forward wall 34 of the cover member 26 in the manner of a spring biased plunger.

The projection of the tips 44 and the displacement of the ferrules 42 with respect to the two piece connector body in the forward direction is limited by the cooperating stops 52 and 53 of the crimp rings 50 and cover ribs 40. The desired amount of spring biased projection for the tips 44 to engage the electro-optic devices 20 properly is provided by adjusting the location of the stops 53 anywhere along the cover ribs 40.

The retained cover member 26 also holds the flexible lock arms 58 down firmly securing the electrical socket terminals 56 in the terminal cavities 30.

The connector plug 12 includes a conventional lock arm 64 of the pump handle type which is integrally attached to the housing member 24. The lock arm 64 cooperates with a lock nib 66 of the header connector 14 to retain the connectors 12 and 14 in the mated position shown in FIG. 1.

The header connector 14 comprises a connector body 70 which has a longitudinal socket 72 for receiving the connector plug 12 so that terminals 56 engage terminal pins 23 and ferrules 44 engage electro-optic devices 20 that are attached to a clip 82. The header connector 14 does not form part of the invention and needs not be described here in detail. However, the header connector 14 and many aspects of plug connector 12 are described in detail in the aforesaid U.S. Pat. No. 4,969,924 which is hereby incorporated in this patent application by reference.

Housing member 24 is shown with loading slots 32. However, loading slots 32 can be eliminated to meet sealing demands if necessary. Elimination of loading slots 32 simply requires attachment of ferrule 42 and seal sleeves 48 to fiber optic cables 18 after the cables are threaded through the cable end of the housing member 24 which is a well known technique. Alternatively a push to seat design such as that shown in the aforesaid U.S. Pat. No. 5,633,969 could be used. U.S. Pat. No. 5,633,969 is also hereby incorporated in this patent specification by reference.

It is also possible to use the subassembly of the invention comprising ferrule 44 and seal sleeve 48 attached to cable 18 by one or two crimp rings in single or multiple cable splices or cable connectors solely for fiber optic cables.

With regard to combined connectors such as disclosed in FIG. 1, it is also possible to configure all cavities identically and to conform the shape of the electric terminals and the fiber optic ferrules so that either an electric terminal or a fiber optic ferrule can be assembled into any cavity.

Referring now to FIGS. 2A through 2D, a connector for a fiber optic cable in accordance with a second aspect of the invention is disclosed. This second embodiment which is directed to an improved coil spring arrangement is indicated generally at 100. It comprises a connector body 102 having a mating end 104, a cable end 106 and a cavity 108 that extends through the connector body from the mating end to the cable end.

Connector 100 further comprises a ferrule 110 that has a forward portion 112 and a rearward portion 114. A longitudinal cable passage 116 extends through forward portion 112 to the open rearward portion 114 that has spaced pillars 118 at the rearward end of a platform 119 to provide forwardly facing spring abutments 120.

A fiber optic cable 122 has a stripped end disposed in the longitudinal cable passage 116 as best shown in FIG. 2C so that the cable 122 projects out of connector body 102 through the rearward portion 114 between spaced pillars 118 as best shown in FIG. 2D.

Connector 100 further comprises a coil spring 124 that surrounds fiber optic cable 122. The front end of coil spring 124 engages a forward ring 125 of an attachment member 126 that is attached to fiber optic cable 122 behind coil spring 124 by a crimp portion 128 as best shown in FIG. 2C.

During assembly, coil spring 124 is disposed between the forward portion 112 of ferrule 110 and spaced pillars 118 at the rearward end of ferrule 110 with the forward ring 125 of attachment member 126 disposed between the front of coil spring 124 and the forward portion 112 of ferrule 110 as best shown in FIG. 2B. Coil spring 124 is preferably compressed slightly.

Fiber optic cable 122 is then threaded through the open crimp portion 128, coil spring 124, ring 125 and forward portion 112 until the bare core tip 129 projects from forward portion 112 a predetermined desired distance. Crimp portion 128 is then tightly crimped around the jacket of fiber optic cable 122 to form the subassembly shown in FIG. 2C.

The subassembly of FIG. 2C is then inserted into connector body 110 and retained in the connector body by latch arm 130 engaging in ferrule cavity 132 as best shown in FIG. 2D. Coil spring 124 assures that the tip of the fiber optic cable 122 projects forwardly of ferrule 110 irrespective of the position of ferrule 110 in connector body 110.

Projecting tip 129 is then biased into engagement with a mating core tip by the action of coil spring 124 when connector 100 is mated to another connector. For example, see U.S. Pat. No. 5,633,969 discussed above.

Coil spring 124 and attachment member 126 may be handled as loose pieces that are assembled to cable 122 as shown, or ring 125 can be secured to coil spring 124 to facilitate handling. As a third alternative, attachment member 126 can be made an integral part of coil spring 124.

In other words this aspect of the invention as well as the first embodiment of the invention have been described in an illustrative manner, and it is to be understood that the terminology, which has been used, is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

What is claimed is:

1. A connector for fiber optic cables comprising:
a connector body having a mating end and a cable end,
the connector body having a longitudinal cavity that extends through the connector body from the mating end to the cable end,
the cavity having an internal shoulder at the cable end, a fiber optic cable having an end disposed in the cavity and projecting out of the cavity through the cable end of the connector body,
a ferrule attached to the end of the fiber optic cable,
an elastomeric seal sleeve attached to the an end of the ferrule, and
the elastomeric seal sleeve being disposed between the ferrule and the internal shoulder for biasing the ferrule toward the mating end of the connector body.

2. The connector as defined in claim 1 wherein the ferrule is attached to the end of the fiber optic cable and the elastomeric seal sleeve is attached to the end of the ferrule by a crimp ring that surrounds portions of the ferrule and the seal sleeve.

3. The connector as defined in claim 1 wherein the end of the ferrule is a thin pliable collar and the elastomeric seal sleeve is attached to the collar by an extension of the seal sleeve that fits over the collar and a crimp ring that fits around the extension.

4. The connector as defined in claim 2 wherein the elastomeric seal sleeve is attached to the fiber optic cable by a second crimp ring.

5. The connector as defined in claim 3 wherein the elastomeric seal sleeve is attached to the fiber optic cable by a second crimp ring.

6. The connector as defined in claim 5 wherein the extension is at one end of the elastomeric sleeve and the second crimp ring fits around an annular end of the seal sleeve that is at an opposite end of the seal sleeve from the one end.

7. The connector as defined in claim 6 wherein the elastomeric sleeve has at least one radial sealing lip between the one end and the opposite end.

8. A connector for fiber optic cables comprising:
a connector body having a mating end and a cable end,
the connector body having a longitudinal cavity that extends through the connector body from the mating end to the cable end,
a ferrule disposed in the chamber,
the ferrule having a forward portion and a rearward portion,
the forward portion having a longitudinal cable passage extending through it,
the rearward portion having a forwardly facing spring abutment,
a fiber optic cable having an end disposed in the longitudinal cable passage of the ferrule and projecting through the rearward portion of the ferrule and out of the cavity through the cable end of the connector body,
a coil spring disposed between the forward portion of the ferrule and the spring abutment of the rearward portion of the ferrule, and
an attachment member engaging a forward portion of the coil spring and attached to the fiber optic cable so that the coil spring biases the fiber optic cable in a direction toward the mating end of the connector body.

9. The connector as defined in claim 8 wherein the attachment member is attached to the fiber optic cable behind the ferrule.

10. The connector as defined in claim 9 wherein the attachment member has a ring that engages a front end of the coil spring.

11. The connector as defined in claim 9 wherein the connector body has a latch for retaining the ferrule in a direction toward the cable end of the connector body.

* * * * *